(12) United States Patent
Liu et al.

(10) Patent No.: US 12,573,240 B2
(45) Date of Patent: Mar. 10, 2026

(54) LIGHT SOURCE SPECTRUM AND MULTISPECTRAL REFLECTIVITY IMAGE ACQUISITION METHODS AND APPARATUSES, AND ELECTRONIC DEVICE

(71) Applicant: ORBBEC INC., Shenzhen (CN)

(72) Inventors: Min Liu, Shenzhen (CN); Bingbing Gong, Shenzhen (CN); Shaoguang Shi, Shenzhen (CN); Zejia Huang, Shenzhen (CN); Dingjun Zhang, Shenzhen (CN); Longye Jiang, Shenzhen (CN)

(73) Assignee: ORBBEC INC., Shenzhen (CN)

( * ) Notice: Subject to any disclaimer, the term of this patent is extended or adjusted under 35 U.S.C. 154(b) by 351 days.

(21) Appl. No.: 18/373,729

(22) Filed: Sep. 27, 2023

(65) Prior Publication Data

US 2024/0021021 A1 Jan. 18, 2024

Related U.S. Application Data

(63) Continuation of application No. PCT/CN2022/094817, filed on May 25, 2022.

(30) Foreign Application Priority Data

May 26, 2021 (CN) .......................... 202110578372.2

(51) Int. Cl.
 *G06V 10/25* (2022.01)
 *G06V 10/50* (2022.01)
 (Continued)

(52) U.S. Cl.
 CPC .............. *G06V 40/45* (2022.01); *G06V 10/25* (2022.01); *G06V 10/507* (2022.01); *G06V 10/60* (2022.01)

(58) Field of Classification Search
 CPC ...... G06V 40/45; G06V 10/25; G06V 10/507; G06V 10/60; G01J 3/28; G01J 3/2803;
 (Continued)

(56) References Cited

U.S. PATENT DOCUMENTS

2008/0046217 A1 2/2008 Polonskiy et al.
2012/0327211 A1* 12/2012 Yamamoto ............. G16H 10/40
382/133
2022/0086372 A1* 3/2022 Menon ................... H04N 25/76

FOREIGN PATENT DOCUMENTS

CN 103234915 A 8/2013
CN 103268499 A 8/2013
(Continued)

OTHER PUBLICATIONS

PCT International Search Report and the Written Opinion mailed Jul. 27, 2022, issued in related International Application No. PCT/CN2022/094817, with partial English translation (12 pages).

*Primary Examiner* — Carol W Chan
(74) *Attorney, Agent, or Firm* — Sheppard Mullin Richter & Hampton LLP

(57) ABSTRACT

A light source spectrum acquisition method includes: acquiring a multispectral image, and determining a multispectral response value of each pixel in the multispectral image; reconstructing an RGB image according to the multispectral image; converting the RGB image into a grayscale image; and determining a target region in the grayscale image, wherein in the target region a grayscale value is less than or equal to a threshold, and calculating a light source spectrum response value according to multispectral response values of pixels of the multispectral image corresponding to the target region.

18 Claims, 6 Drawing Sheets

(51) Int. Cl.
   *G06V 10/60*         (2022.01)
   *G06V 40/40*         (2022.01)

(58) Field of Classification Search
   CPC ......... G01J 2003/2826; G01J 2003/425; G01J
                 1/4204; G01N 21/25; G01N 21/84; G06T
                                   5/92; G06T 7/136
   See application file for complete search history.

(56)                      References Cited

FOREIGN PATENT DOCUMENTS

| | | | | | |
|---|---|---|---|---|---|
| CN | 110046564 A | | 7/2019 | | |
| CN | 111353326 A | * | 6/2020 | ........... | G06V 40/172 |
| CN | 111368587 A | | 7/2020 | | |
| CN | 111814564 A | * | 10/2020 | ............ | G06V 40/45 |
| CN | 113297977 A | | 8/2021 | | |
| CN | 113340816 A | | 9/2021 | | |
| CN | 113340817 A | | 9/2021 | | |

* cited by examiner

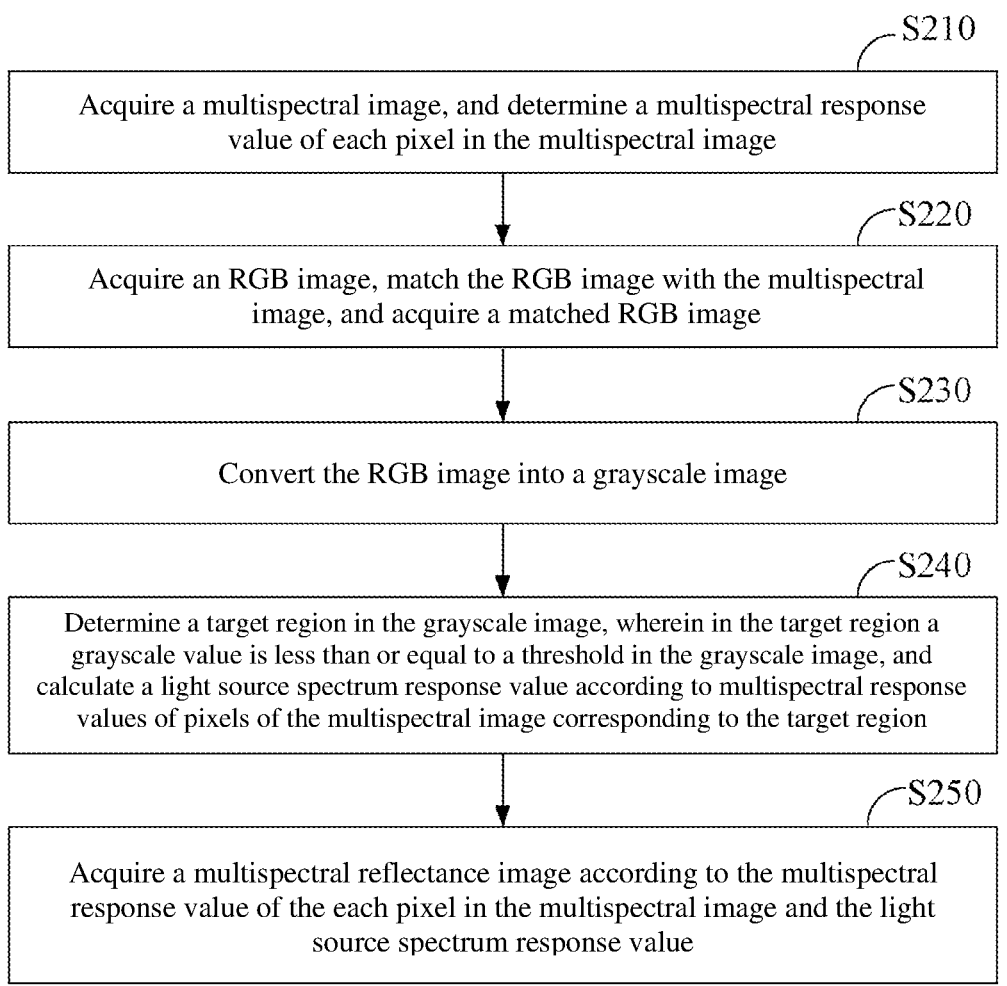

S210

Acquire a multispectral image, and determine a multispectral response value of each pixel in the multispectral image

S220

Acquire an RGB image, match the RGB image with the multispectral image, and acquire a matched RGB image

S230

Convert the RGB image into a grayscale image

S240

Determine a target region in the grayscale image, wherein in the target region a grayscale value is less than or equal to a threshold in the grayscale image, and calculate a light source spectrum response value according to multispectral response values of pixels of the multispectral image corresponding to the target region

S250

Acquire a multispectral reflectance image according to the multispectral response value of the each pixel in the multispectral image and the light source spectrum response value

FIG. 3

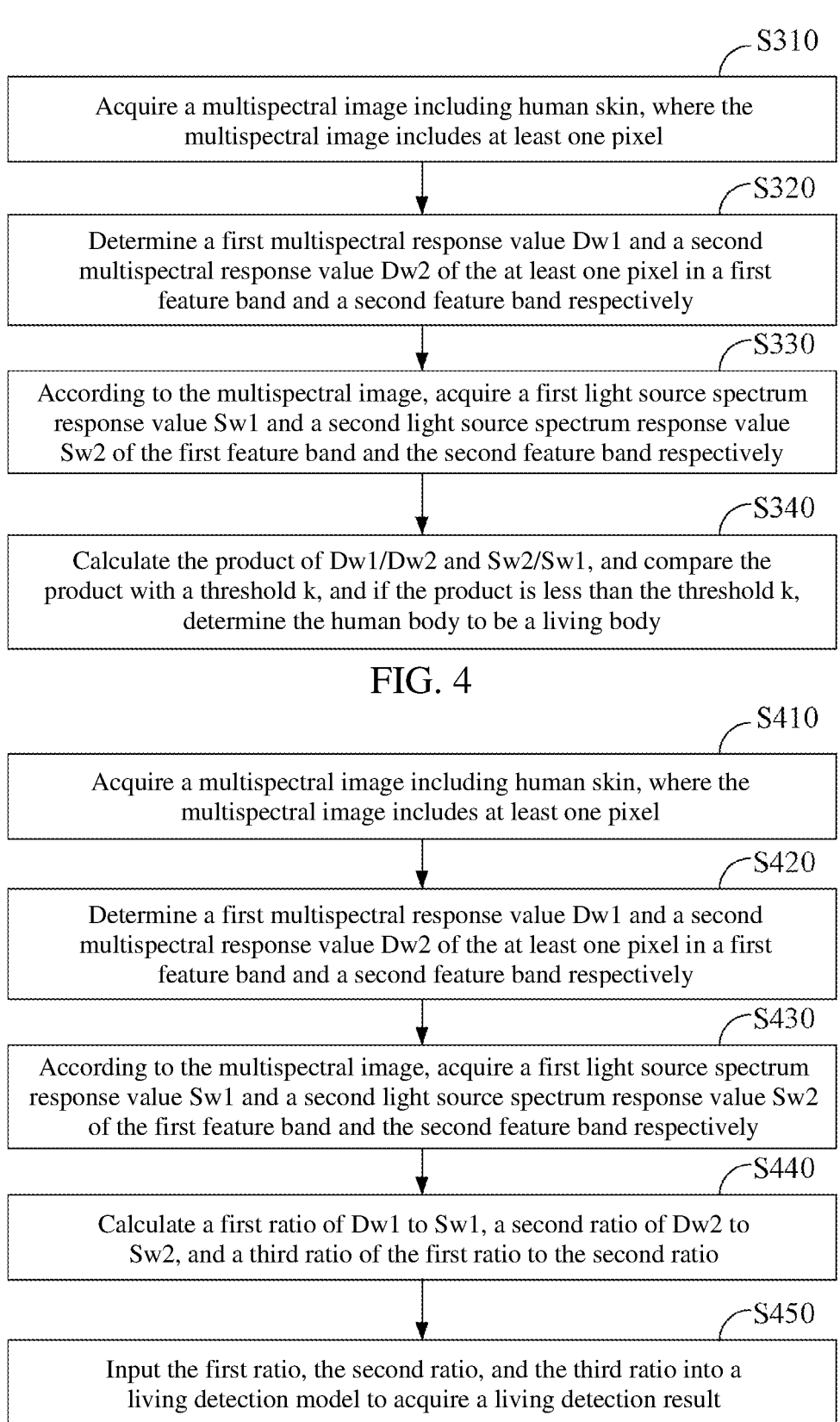

S310

Acquire a multispectral image including human skin, where the multispectral image includes at least one pixel

S320

Determine a first multispectral response value Dw1 and a second multispectral response value Dw2 of the at least one pixel in a first feature band and a second feature band respectively

S330

According to the multispectral image, acquire a first light source spectrum response value Sw1 and a second light source spectrum response value Sw2 of the first feature band and the second feature band respectively

S340

Calculate the product of Dw1/Dw2 and Sw2/Sw1, and compare the product with a threshold k, and if the product is less than the threshold k, determine the human body to be a living body

Acquire a multispectral image including human skin, where the multispectral image includes at least one pixel

S420

Determine a first multispectral response value Dw1 and a second multispectral response value Dw2 of the at least one pixel in a first feature band and a second feature band respectively

S430

According to the multispectral image, acquire a first light source spectrum response value Sw1 and a second light source spectrum response value Sw2 of the first feature band and the second feature band respectively

S440

Calculate a first ratio of Dw1 to Sw1, a second ratio of Dw2 to Sw2, and a third ratio of the first ratio to the second ratio

S450

Input the first ratio, the second ratio, and the third ratio into a living detection model to acquire a living detection result

FIG. 5

LIGHT SOURCE SPECTRUM AND MULTISPECTRAL REFLECTIVITY IMAGE ACQUISITION METHODS AND APPARATUSES, AND ELECTRONIC DEVICE

CROSS-REFERENCE TO RELATED APPLICATIONS

This application is a Continuation Application of International Patent Application No. PCT/CN2022/094817 filed on May 25, 2022, which claims priority to Chinese Patent Application No. 202110578372.2, filed on May 26, 2021. The entire content of all of the above-referenced applications is incorporated herein by reference.

TECHNICAL FIELD

This application relates to the field of multispectral detection technologies, and in particular, to a light source spectrum acquisition method and apparatus, and an electronic device; and a multispectral reflectance image acquisition method and apparatus, and an electronic device.

BACKGROUND

The technology of multispectral imaging and multispectral analysis can not only acquire spatial image dimension information, but also acquire spectral dimension information. The principle of multispectral imaging is to divide the incident light into several narrow light bands and image the lights on a multispectral detector, so as to acquire images of different spectral bands and form multispectral three-dimensional data. The multispectral data processing method is to extract textures from the image dimension, such as local binary pattern (LBP) texture extraction, gray-level co-occurrence matrix texture extraction, and histogram of oriented gradient (HOG) texture extraction; and extract features related to substance composition and color from the spectral dimension. Finally, the image dimension information and the spectral dimension information are fused to analyze a target object.

If a spectrum of the ambient light in which a multispectral image is taken is known, a response value of each pixel of the multispectral image is divided by the spectrum of the ambient light to acquire a multispectral reflectance image. The image is related to the nature of the object being taken and does not change with the light source. The spectrum of the ambient light is a light source spectrum, which refers to the light source spectrum that is incident on a surface of a multispectral subject. Thus, the acquisition of a higher-precision spectrum of the ambient light is crucial to the acquisition of a high-precision multispectral reflectance image. Therefore, how to acquire the higher-precision spectrum of the ambient light is an urgent problem to be resolved.

SUMMARY

Embodiments of this application provide a light source spectrum acquisition method and apparatus, and an electronic device; and a multispectral reflectance image acquisition method and apparatus, and an electronic device, which can acquire a high-precision spectrum of the ambient light.

According to a first aspect, an embodiment of this application provides a light source spectrum acquisition method, including: acquiring a multispectral image, and determining a multispectral response value of each pixel in the multispectral image; reconstructing an RGB image according to the multispectral image; converting the RGB image into a grayscale image; and determining a target region in the grayscale image, wherein in the target region a grayscale value is less than or equal to a threshold, and calculating a light source spectrum response value according to multispectral response values of pixels of the multispectral image corresponding to the target region.

In this embodiment, the target region in which the grayscale value is less than the threshold or the grayscale value is less than or equal to the threshold is found, and the light source spectrum response value is calculated based on the target region, which can improve the accuracy of an acquired light source spectrum.

As an implementation of the first aspect, a grayscale value corresponding to a pixel in the grayscale image is calculated according to three-channel values of the pixel in the RGB image. Each pixel of the grayscale image can be similarly processed.

As an example of this implementation, a grayscale value corresponding to each pixel is calculated according to the formula $deta=abs(1-G/B)+abs(1-R/B)$, where R, G, and B represent three-channel values of each pixel in the RGB image, that is value R, value G, and value B, and abs represents an absolute value function.

As an implementation of the first aspect, after the converting the RGB image into a grayscale image, the method further includes: determining the threshold according to the grayscale image.

As an implementation, the determining the threshold according to the grayscale image includes: performing histogram statistics on the grayscale image to obtain a histogram statistical result, and determining the threshold according to interval parameters of a minimum value interval in the histogram statistical result.

As an implementation, the determining the threshold according to interval parameters of a minimum value interval in the histogram statistical result includes: determining the threshold according to an interval boundary value and a pixel proportion of the minimum value interval in the histogram statistical result.

As an implementation of the first aspect, the calculating a light source spectrum response value according to multispectral response values of pixels of the multispectral image corresponding to the target region includes: calculating an average value of the multispectral response values of the pixels of the multispectral image corresponding to the target region to acquire the light source spectrum response value.

According to a second aspect, an embodiment of this application provides a multispectral reflectance image acquisition method, including: acquiring a multispectral image, and determining a multispectral response value of each pixel in the multispectral image; reconstructing an RGB image according to the multispectral image; converting the RGB image into a grayscale image; and determining a target region in the grayscale image, wherein in the target region a grayscale value is less than or equal to a threshold, and calculating a light source spectrum response value according to multispectral response values of pixels of the multispectral image corresponding to the target region; and acquiring a multispectral reflectance image according to the multispectral response value of the each pixel in the multispectral image and the light source spectrum response value.

In this embodiment, the target region in which the grayscale value is less than the threshold or the grayscale value is less than or equal to the threshold is found, and the light source spectrum response value is calculated based on the target region, which can improve the accuracy of an acquired light source spectrum, thereby improving the precision of the multispectral reflectance image.

As an implementation of the second aspect, a gray scale value corresponding to a pixel in the grayscale image is calculated according to three-channel values of the pixel in the RGB image. Each pixel of the grayscale image can be similarly processed.

As an example of this implementation, a grayscale value corresponding to each pixel is calculated according to the formula deta=abs(1−G/B)+abs(1−R/B), where R, G, and B represent three-channel values of each pixel in the RGB image, that is value R, value G, and value B, and abs represents an absolute value function.

As an implementation of the second aspect, after the converting the RGB image into a grayscale image, the method further includes: determining the threshold according to the grayscale image.

As an implementation, the determining the threshold according to the grayscale image includes: performing histogram statistics on the grayscale image to obtain a histogram statistical result, and determining the threshold according to interval parameters of a minimum value interval in the histogram statistical result.

As an implementation, the determining the threshold according to interval parameters of a minimum value interval in the histogram statistical result includes: determining the threshold according to an interval boundary value and a pixel proportion of the minimum value interval in the histogram statistical result.

As an implementation of the second aspect, the calculating a light source spectrum response value according to multispectral response values of pixels of the multispectral image corresponding to the target region includes: calculating an average value of the multispectral response values of the pixels of the multispectral image corresponding to the target region to acquire the light source spectrum response value.

As an implementation of the second aspect, the acquiring a multispectral reflectance image according to the multispectral response value of each pixel in the multispectral image and the light source spectrum response value includes: acquiring the multispectral reflectance image through dividing the multispectral response value of each pixel in the multispectral image by the light source spectrum response value.

According to a third aspect, an embodiment of this application provides a light source spectrum acquisition apparatus, including: an acquisition module, configured to acquire a multispectral image, and determine a multispectral response value of each pixel in the multispectral image; a reconstruction module, configured to reconstruct an RGB image according to the multispectral image; a conversion module, configured to convert the RGB image into a grayscale image; and a first calculation module, configured to determine a target region in the grayscale image, wherein in the target region a grayscale value is less than or equal to a threshold, and calculate a light source spectrum response value according to multispectral response values of pixels of the multispectral image corresponding to the target region.

According to a fourth aspect, an embodiment of this application provides a multispectral reflectance image acquisition apparatus, including: an acquisition module, configured to acquire a multispectral image, and determine a multispectral response value of each pixel in the multispectral image; a reconstruction module, configured to reconstruct an RGB image according to the multispectral image; a conversion module, configured to convert the RGB image into a grayscale image; a first calculation module, configured to determine a target region in the grayscale image, wherein in the target region a grayscale value is less than or equal to a threshold, and calculate a light source spectrum response value according to multispectral response values of pixels of the multispectral image corresponding to the target region; and a second calculation module, configured to acquire a multispectral reflectance image according to the multispectral response value of the each pixel in the multispectral image and the light source spectrum response value.

According to a fifth aspect, an embodiment of this application provides an electronic device, including: a memory, a processor, and a computer program stored in the memory and executable on the processor. The processor, when executing the computer program, implements the light source spectrum acquisition method according to the first aspect or any implementation of the first aspect, and/or implements the multispectral reflectance image acquisition method according to the second aspect or any implementation of the second aspect.

According to a sixth aspect, an embodiment of this application provides a computer-readable storage medium, storing a computer program. The computer program, when executed by a processor, implements the light source spectrum acquisition method according to the first aspect or any implementation of the first aspect, and/or implements the multispectral reflectance image acquisition method according to the second aspect or any implementation of the second aspect.

According to a seventh aspect, an embodiment of this application provides a computer program product. The computer program product, when run on an electronic device, causes the electronic device to implement the light source spectrum acquisition method according to the first aspect or any implementation of the first aspect, and/or implement the multispectral reflectance image acquisition method according to the second aspect or any implementation of the second aspect.

It may be understood that, for beneficial effects of the third aspect to the seventh aspect, reference may be made to related descriptions in the first aspect or the second aspect. Details are not described herein again.

BRIEF DESCRIPTION OF THE DRAWINGS

To describe the technical solutions in the embodiments of this application more clearly, the following briefly describes the accompanying drawings required for describing the embodiments or existing technologies. Apparently, the accompanying drawings in the following description show merely some embodiments of this application, and a person of ordinary skill in the art may still derive other drawings from these accompanying drawings without creative efforts.

FIG. 3 is a flowchart of another multispectral reflectance image acquisition method, according to an embodiment of this application;

FIG. 4 is a flowchart of a live detection method, according to an embodiment of this application;

FIG. 5 is a flowchart of another live detection method, according to an embodiment of this application;

DETAILED DESCRIPTION

Figure 1:
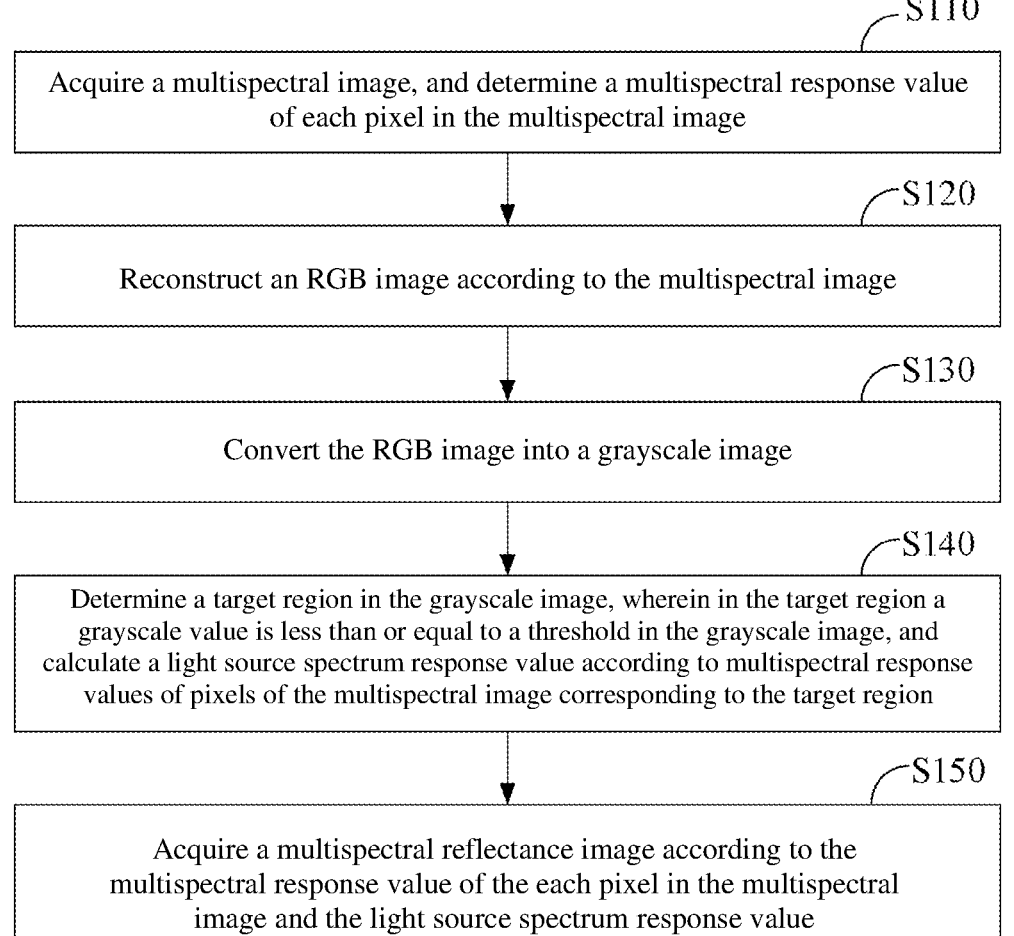
FIG. 1 is a flowchart of a multispectral reflectance image acquisition method, according to an embodiment of this application.

In the following description, for the purpose of illustration rather than limitation, specific details such as the specific system structure and technology are proposed to thoroughly understand the embodiments of this application. However, a person skilled in the art knows that this application may be implemented in other embodiments without these specific details. In other cases, detailed descriptions of well-known systems, apparatuses, circuits, and methods are omitted to avoid unnecessary details hindering the description of this application.

A term "and/or" used in this specification of this application and the appended claims refers to one or more of any and all possible combinations of the associated items that is listed and includes the combinations.

"An embodiment" or "some embodiments" described in the specification of this application means that particular features, structures, or characteristics described with reference to the embodiment are included in one or more embodiments of this application. Therefore, the statements "in one embodiment", "in some embodiments", "in some other embodiments", "in still some other embodiments" appearing at different parts in this specification do not necessarily refer to the same embodiment, but mean "one or more but not all embodiments", unless otherwise particularly emphasized in other ways. The terms "include", "comprise", "have", and variations thereof all mean "include but not limited to", unless otherwise particularly emphasized in other ways.

In addition, in the description of this application, "a plurality of" means two or more than two. The terms "first", "second", "third", and "fourth" are merely intended for distinguishing descriptions, and shall not be understood as an indication or implication of relative importance.

To describe technical solutions in this application, the following will be described by using specific embodiments.

A light source estimation method generally includes two types: A first method is a light source spectrum estimation method based on a white world. This method is to find the brightest region of a multispectral image, and calculate an average spectrum as a light source spectrum. This method has a better restoration effect when the brightest region is a white region. A second method is a light source spectrum estimation method based on a gray world. This method is to calculate an average spectrum of an entire multispectral image as a light source spectrum. This method has a better restoration effect for scenes with rich colors.

The two methods are both based on the fuzzy prediction of the entire multispectral image to estimate the light source spectrum. For example, for the light source spectrum prediction based on the white world, the brightest region in the multispectral image is taken as the light source spectrum. If the brightest region is not white, the prediction error is relatively large. In another example, for the light source spectrum prediction based on the gray world, the average value of all pixels in the multispectral image is taken as the light source spectrum. If there are few white regions in the image and there is a large area of single color, the prediction error is relatively large.

The above two methods have a weak adaptability and a relatively large error in application scenarios with different light sources. In order to resolve the technical problem of how to more accurately predict the ambient light or the light source spectrum (or referred to as the ambient light or the light source approximate spectrum), the embodiments of this application provide a multispectral reflectance image acquisition method in which a multispectral image can be acquired, and a light source region can be located in the multispectral image, so as to determine the light source spectrum according to multispectral information of the light source region.

Embodiment 1

FIG. 1 is a flowchart of a multispectral reflectance image acquisition method, according to an embodiment of this application. The multispectral reflectance image acquisition method in this embodiment may be performed by an electronic device. The electronic device includes but is not limited to a computer, a tablet computer, a server, a mobile phone, a multispectral camera, or the like. The server includes but is not limited to an independent server, a cloud server, or the like. In this embodiment, the multispectral reflectance image acquisition method is applicable to a situation in which the light source spectrum (or the light source approximate spectrum) in the current environment needs to be predicted. As shown in FIG. 1, the multispectral reflectance image acquisition method may include step S110 to step S150.

S110: Acquire a multispectral image, and determine a multispectral response value of each pixel in the multispectral image.

The multispectral image is a single multispectral image. The multispectral image of any scene (there is ambient light or a light source in the scene) is acquired through the multispectral camera. Information included in the single multispectral image includes response value information of each pixel. The response value information represents the response of the light reflected onto the multispectral camera. The response value information changes with the intensity of the light source, the shape of the light source spectrum, and the lighting direction of the light source.

A quantity of channels of the multispectral camera may be a few to a dozen, such as eight channels, nine channels, or sixteen channels. This embodiment does not limit the quantity of channels of the multispectral camera and the band of each channel. In order to better understand this embodiment, a nine-channel multispectral camera is hereinafter used as an example of the multispectral camera. It should be understood that the exemplary description cannot be interpreted as a specific limitation on this embodiment.

As a nonrestrictive example, the multispectral camera is a nine-channel multispectral camera, and each pixel of the nine-channel multispectral camera can acquire nine response values: $x1$, $x2$, $x3$, $x4$, $x5$, $x6$, $x7$, $x8$, and $x9$. That is, the multispectral response value of each pixel is the nine response values corresponding to the nine channels. $x1$ represents a response value of a first channel with a response curve feature q1; x2 represents a response value of a second channel with a response curve feature q2; x3 represents a response value of a third channel with a response curve feature q3; and x9 represents a response value of a ninth channel with a response curve feature q9. That is, xi represents a response value of an $i^{th}$ channel with a response curve feature qi, and i is an integer from 1 to 9.

S120: Reconstruct a RGB image according to the multispectral image.

Each pixel in the RGB image has response values of three channels, that is, a value R of a channel R, a value G of a channel G, and a value B of a channel B. Reconstructing the RGB image according to the multispectral image is to calculate the value R, the value G, and the value B of the each pixel according to the multispectral response value of the each pixel in the multispectral image.

As an implementation, in step S120, the reconstructing a RGB image according to the multispectral image includes step S121 to step S124 as follows:

S121: Acquire quantum efficiency (QE) response curves of the nine channels of the multispectral camera.

QE response curve matrices of the nine channels of the multispectral camera are acquired. The QE response curve matrices may be recorded as q1, q2, q3, q4, q5, q6, q7, q8, and q9. The matrix q1 is a response curve of the first channel, the matrix q2 is a response curve of the second channel, and the matrix q9 is a response curve of the ninth channel. That is, a matrix qj is a response curve of a $j^{th}$ channel, and the value of j is an integer from 1 to 9. It should be noted that, for a fixed multispectral camera (or multispectral hardware), these response curves can be acquired through testing. After these curves are acquired through testing, these curves can be prestored in a memory of the electronic device and called when needed.

S122: Acquire tristimulus value curves, that is, a curve r, a curve g, and a curve b.

Spectral tristimulus value curves of the CIE1931RGB system including the curve r, the curve g, and the curve b are acquired. It should be noted that, these curves are known and can be found from the CIE standard. The three curves are prestored in the memory of the electronic device and called when needed.

S123: Use the QE response curves of the nine channels to linearly fit the tristimulus value curves to acquire fitting parameters.

The linear fitting method is used to linearly fit the curve r, the curve g, and the curve b using the response curves of the nine channels, that is, the curves q1, q2, q3, q4, q5, q6, q7, q8, and q9. Linear fitting formulas are as follows:

$$r=a1*q1+a2*q2+a3*q3+a4*q4+a5*q5+a6*q6+a7*q7+a8*q8+a9*q9;$$

$$g=b1*q1+b2*q2+b3*q3+b4*q4+b5*q5+b6*q6+b7*q7+b8*q8+b9*q9; \text{ and}$$

$$b=c1*q1+c2*q2+c3*q3+c4*q4+c5*q5+c6*q6+c7*q7+c8*q8+c9*q9.$$

The partial least-square method is used to solve the above equations, to acquire the values of the fitting parameters, that is, the values of the following parameters: a1, a2, a3, a4, a5, a6, a7, a8, a9; b1, b2, b3, b4, b5, b6, b7, b8, b9; and c1, c2, c3, c4, c5, c6, c7, c8, c9.

S124: Perform fitting calculation according to the fitting parameters and the multispectral response value of each pixel to acquire the value R, the value G, and the value B of each pixel.

According to step S110, the response values of the nine channels of a pixel in the multispectral image are determined to be: x1, x2, x3, x4, x5, x6, x7, x8, and x9. The fitting parameters are calculated according to step S123, and the fitting calculation is performed according to the fitting parameters and the response values of the nine channels of the pixel to acquire the value R, the value G, and the value B of the pixel in step S124. The formulas are as follows:

$$R=a1*x1+a2*x2+a3*x3+a4*x4+a5*x5+a6*x6+a7*x7+a8*x8+a9*x9;$$

$$G=b1*x1+b2*x2+b3*x3+b4*x4+b5*x5+b6*x6+b7*x7+b8*x8+b9*x9; \text{ and}$$

$$B=c1*x1+c2*x2+c3*x3+c4*x4+c5*x5+c6*x6+c7*x7+c8*x8+c9*x9.$$

The value R, the value G, and the value B of each pixel in the multispectral image are acquired through the fitting calculation, and the RGB image corresponding to the entire multispectral image is acquired, that is, the RGB image is reconstructed according to the multispectral image.

In some other embodiments, after the RGB image is reconstructed, the RGB image can also be white balanced to acquire the white balanced RGB image, which may be recorded as an RGB_wb image. In these embodiments, in the subsequent step S130, the RGB_wb image is converted into a grayscale image.

In some implementations, the existing white balance method, such as gray world, white world, or automatic threshold, can be directly used to white balance the RGB image to acquire the white balanced RGB image RGB_wb. By using this white balance step, a region in which a deta value is close to 0 acquired in the subsequent step S140 can better correspond to the gray region or the white region, so that a region selection result can be acquired more accurately, to acquire a more accurate light source spectrum.

S130: Convert the RGB image into a grayscale image.

The grayscale image may be referred to as a deta image. The grayscale value corresponding to each pixel in the grayscale image is calculated according to multi-channel values of the pixel in the RGB image.

According to the value R, the value G, and the value B of the channels R, G, and B of each pixel in the RGB image, the grayscale value (or deta value) of the pixel is calculated. According to the grayscale value (or deta value) of each pixel, the grayscale image (or deta image) corresponding to the RGB image is acquired. That is, the grayscale value (or deta value) corresponding to each pixel of the grayscale image (or deta image) is calculated according to the multi-channel values of the pixel in the RGB image, that is, the value R, the value G, and the value B.

As a nonrestrictive example, the channels R, G, and B of the RGB image are extracted. For each pixel, the deta value corresponding to the pixel is calculated according to the formula deta=abs(1−G/B)+abs(1−R/B), and the deta value is assigned to the pixel of the gray scale image as the grayscale value. The deta image is acquired according to the grayscale value of each pixel, where abs in the formula represents an absolute value function.

S140: Determine a target region in which a grayscale value is less than a threshold in the grayscale image, and calculate a light source spectrum response value according to the multispectral response value of each pixel corresponding to the target region in the multispectral image.

The target region in which the grayscale value (or deta value) is less than the threshold in the grayscale image (or deta image) is determined. A threshold t may be a value close to 0. The spectral response value of the light source is calculated according to the multispectral response value of each pixel of the multispectral image corresponding to the target region.

In this embodiment, finding a region in which the deta value is close to 0 in the deta image is to find a region in which the value R, the value G, and the value B are close. When the value R, the value G, and the value B are close, the region may be a white region or a gray region with different grayscales. The reflectance of the white region and/or the gray region is a straight line, the curve of the incident light source spectrum is consistent with the curve of the reflected light source spectrum, and the only difference is brightness. Therefore, the spectrum of the white region and/or the gray region can more accurately reflect the light source spectrum.

As an implementation of this embodiment, histogram statistics are performed on the deta image, that is, histogram statistics are used to calculate the distribution of the deta data in the deta image, and the threshold t is determined according to a histogram statistical result of the deta image. After the histogram statistics are performed on the deta image, the threshold t is determined according to interval parameters of a minimum value interval in the histogram statistical result. The interval parameters include, but are not limited to, one or more of a quantity of pixels, the proportion of pixels, and the interval boundary value.

Figure 2:
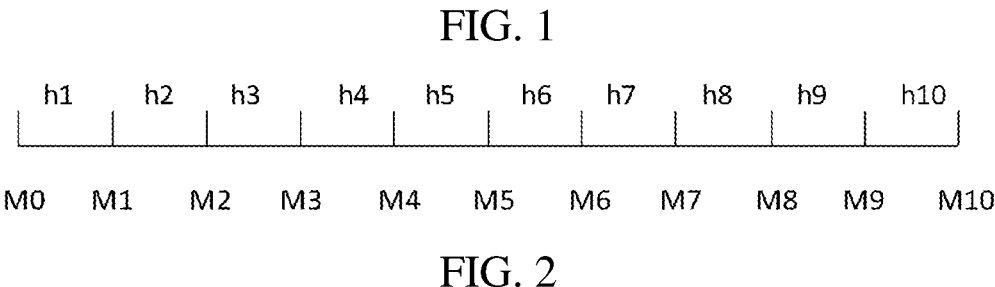
FIG. 2 is a schematic diagram of a statistical result of histogram statistics on a grayscale image, according to an embodiment of this application.

As a nonrestrictive example, the statistical process of histogram statistics on the grayscale image (or deta image) is as follows: First, the minimum value M0 and the maximum value M10 of the grayscale value (or deta value) are found; and then between the minimum value M0 and the maximum value M10, 10 ranges (or referred to as value intervals) are obtained through division, and the 10 value intervals from small to large are: [M0, M1], [M1, M2], [M2, M3], [M3, M4], [M4, M5], [M5, M6], [M6, M7], [M7, M8], [M8, M9], and [M9, M10], where M0, M1, M2, M3, M4, M5, M6, M7, M8, M9, or M10 may be referred to as an interval value M. The quantity of pixels whose grayscale value is greater than or equal to M0 and less than M1, that is, the quantity of pixels of a first value interval or the minimum value interval, is counted. The proportion of the quantity of pixels to the total quantity of pixels is h1, that is, the proportion h of pixels in the first value interval is h1. Using the same method, the proportions h of pixels of a second value interval to a tenth value interval are acquired as follows: h2, h3, h4, h5, h6, h7, h8, h9, and h10. FIG. 2 is a schematic diagram of a statistical result of histogram statistics on the deta image. For the first value interval or the minimum value interval, t=M0+(M1−M0)*h1. The value t corresponding to each value interval is different, and is related to the interval value M and the value h of this value interval. In this embodiment, as long as the value t of the first value interval is found, the value t that makes deta close to 0 is determined.

As another nonrestrictive example, first, the minimum value M0 and the maximum value M10 of the grayscale value (or deta value) are found; and then between the minimum value M0 and the maximum value M10, 10 ranges (or referred to as value intervals) are obtained through division. Interval parameters of the first value interval, that is, the minimum value interval, are determined. The quantity of pixels whose deta value is greater than or equal to M0 and less than M1, that is, the quantity of pixels of the minimum value interval, is counted. The proportion of the quantity of pixels to the total quantity of pixels is h1, that is, the proportion of pixels in the first value interval is h1. Finally, the preset value t is determined according to M0, M1, and h1. For example, t=M0+(M1−M0)*h1. In this way, the value t that makes deta close to 0 is determined.

After the threshold t is determined, the target region in which deta<t is counted, that is, the target region in which the deta value is close to 0 in the grayscale image is found, and the average value of each channel in the nine channels of each pixel corresponding to the target region in the multispectral image is calculated. The average multispectral data of the target region is the approximate light source spectrum. For example, the target region in which deta<t in the grayscale image includes N pixels, where N is a positive integer. The multispectral response values of the nine channels of the N pixels corresponding to the target region in the multispectral image are acquired. For each channel in the nine channels, the average value of the multispectral response values of the N pixels is calculated, and the average value is taken as the light source spectrum response value. Each pixel in the N pixels corresponds to the multispectral response values of the nine channels, so that the average value is nine values corresponding to the nine channels.

In another implementation of this embodiment, after the threshold t is determined, the target region in which deta<=t is counted.

It should be noted that, in this embodiment, the quantity of value intervals obtained through division during histogram statistics can be an empirical value, for example, can be acquired according to the experience of existing shooting data. The more the intervals are obtained through division, the closer the acquired deta value of the target region is to 0, and the more accurate the acquired light source spectrum is theoretically. However, when the target region in which the deta value is close to 0 includes only a few pixels due to a sufficient quantity of intervals obtained through division, the noise may be too large, and the noise of the light source spectrum may be too large. Therefore, the quantity of intervals obtained through division needs to be considered in a compromise, neither too large nor too small. This is not limited in this application.

It should be further noted that, a plurality of value intervals obtained through division during histogram statistics may include one or a combination of a left open and right closed interval, a left closed and right open interval, a left open and right open interval, and a left closed and right closed interval. This is not limited in this application.

S150: Acquire a multispectral reflectance image according to the multispectral response value of each pixel in the multispectral image and the light source spectrum response value.

As an implementation of this embodiment, the multispectral response value of each pixel in the multispectral image is determined according to step S110, and the light source spectrum response value is determined according to step S140. Therefore, in step S150, the multispectral response value of each pixel in the multispectral image is divided by the light source spectrum response value to acquire a multispectral reflectance image.

As a nonrestrictive example, the multispectral response values of the nine channels of a pixel in the multispectral image are x1, x2, x3, x4, x5, x6, x7, x8, and x9. The light source spectrum response value, that is, the average value of the multispectral response values of the nine channels, is y1, y2, y3, y4, y5, y6, y7, y8, and y9. x1/y1, x2/y2, x3/y3, x4/y4, x5/y5, x6/y6, x7/y7, x8/y8, and x9/y9 are calculated to acquire the reflectance of the pixel. After the reflectance of each pixel is calculated, the multispectral reflectance image corresponding to the multispectral image is acquired.

In this embodiment, the advantage that the multispectral image can restore the RGB image is used to find the white region or the grayscale region from the restored RGB image. Since the spectrum of the white region or the grayscale region in the multispectral image is a spectrum closest to the light source, the step of region selection is added in this solution. The average spectrum of this region is used as the light source approximate spectrum. The precision of the predicated light source spectrum is relatively high, and can be applied to scenarios with different light sources. The multispectral reflectance image calculated based on the light source spectrum is also more precise.

Embodiment 2

FIG. 3 is a flowchart of a multispectral reflectance image acquisition method, according to another embodiment of this application. The multispectral reflectance image acquisition method in this embodiment may be performed by an electronic device. As shown in FIG. 3, the multispectral reflectance image acquisition method may include step S210 to step S250. It should be understood that, for the similarities between Embodiment 2 and Embodiment 1, refer to the description of the above method, which is not repeated herein again.

S210: Acquire a multispectral image, and determine a multispectral response value of each pixel in the multispectral image.

S220: Acquire an RGB image, match the RGB image with the multispectral image, and acquire a matched RGB image.

In Embodiment 1, the RGB image is reconstructed according to the multispectral image, and therefore the RGB image and the multispectral image have the same viewing angle. However, in Embodiment 2, the RGB image of the same scene is acquired through another camera, that is, a color camera. Therefore, the RGB image has a different viewing angle from the multispectral image acquired through the multispectral camera, and the matching operation is needed.

As an implementation of this embodiment, pixel points in the RGB image correspond to pixel points in the multispectral image in a one-to-one correspondence. For example, an object in the RGB image corresponds and pixel points of the object in the multispectral image. When the gray region and the white region are found through the RGB image, the gray region and the white region in the multispectral image are found through the correspondence, and an average value of multi-channel responses of this region is calculated as an approximate light source spectrum response value.

In this embodiment, the color camera and the multispectral camera are arranged adjacent to each other. The closer the two cameras are, the closer the view fields taken by receiver ends or imaging ends of the two camera are. In this way, the RGB image and the multispectral image have more corresponding pixel points in the matching process, which can increase the precision of a light source spectrum prediction result.

S230: Convert the matched RGB image into a grayscale image.

The grayscale value corresponding to each pixel in the grayscale image is calculated according to a multi-channel value of the pixel in the matched RGB image.

S240: Determine a target region in the grayscale image, wherein in the target region a grayscale value is less than (or equal to) a threshold in the grayscale image, and calculate a light source spectrum response value according to the multispectral response value of each pixel of the multispectral image corresponding to the target region.

S250: Acquire a multispectral reflectance image according to the multispectral response value of each pixel in the multispectral image and the light source spectrum response value.

The difference between Embodiment 2 and Embodiment 1 is that step S120 is different from S220, and other steps are the same or similar. In Embodiment 1, the RGB image is reconstructed according to the multispectral image, so that the RGB image and the multispectral image are acquired by the same camera and have the same viewing angle. Therefore, the precision of the predicted light source spectrum in Embodiment 1 is higher than that in Embodiment 2.

The multispectral reflectance image acquired based on the methods of Embodiment 1 and Embodiment 2 is more robust when undergoes live detection, applied to other models, or applied under different light sources. For example, the analysis result of the live detection is performed based on the multispectral reflectance image does not change with the light source, and is more robust. Next, a live detection method is introduced.

Since the spectral features of real human skin and prostheses (such as false fingers or masks) in several feature bands are quite different, the spectral features of the skin can be applied by using the band ratio method provided in this application to eliminate most prostheses, which is sufficient to meet the precision requirements of ordinary products. For example, the features of the real human skin include: in a band of 420 nm to 440 nm, the skin has melanin to absorb particularly; in a band of 550 nm to 590 nm, the skin has hemoglobin to absorb particularly; in a band of 960 nm to 980 nm, the skin has moisture to absorb particularly; and in a band of 800 nm to 850 nm, skin absorption is relatively weak (that is, reflection is relatively high). For initiating payment with relatively high precision requirements, this band ratio method can be used as the first step of determining of the multispectral live detection and eliminate most prostheses. When faced with the prostheses with extremely high precision, higher-precision models such as machine learning or deep learning are used to determine. The calculation process of the band ratio method is simple, and is less affected by ambient light and dark noise.

Embodiment 3

FIG. 4 is a flowchart of a live detection method, according to another embodiment of this application. The live detection method in this embodiment may be performed by an electronic device. As shown in FIG. 4, the live detection method may include step S310 to step S340.

S310: Acquire a multispectral image including human skin, where the multispectral image includes at least one pixel.

The human skin includes, but is not limited to, the skin of an uncovered part or a region of the human body, such as the skin of a face, or the skin of a region of a face, or the skin of a finger.

The multispectral image including the human skin is acquired through a multispectral camera. The multispectral image includes at least one pixel. It should be noted that, the at least one pixel is a pixel for human skin imaging.

S320: Determine a first multispectral response value $Dw1$ and a second multispectral response value $Dw2$ of the at least one pixel in a first feature band and a second feature band respectively.

According to the multispectral image, the first multispectral response value $Dw1$ of the at least one pixel in the first feature band and the second multispectral response value $Dw2$ in the second feature band are determined.

According to the description of Embodiment 1, the multispectral image includes multispectral response values of multiple channels of each pixel. In Embodiment 1, the quantity and bands of channels are not limited, while in Embodiment 3, the multiple channels include at least two channels: the first feature band and the second feature band, and the quantity and bands of other channels are not limited. That is, in Embodiment 3, the quantity of channels of the multispectral camera is at least two, including at least two channels: the first feature band and the second feature band. The multispectral image includes the multispectral response values of at least two channels of each pixel, that is, includes the first multispectral response value $Dw1$ of the first feature band and the second multispectral response value $Dw2$ of the second feature band. Therefore, according to the multispectral image, the first multispectral response value $Dw1$ of the first feature band and the second multispectral response value $Dw2$ of the second feature band of the at least one pixel corresponding to the human skin are determined.

In Embodiment 3, two representative bands, that is, a first feature band $w1$ and a second feature band $w2$, can be selected according to reflective spectral features of the real human skin.

In some implementations, the first feature band $w1$ is selected as an absorption peak band peculiar to the real human skin, and in this band, the reflectance of the prosthesis is quite different from that of the real human skin. For example, in a band of 420 nm to 440 nm or a band within this band, the band is a melanin absorption band peculiar to the real human skin. In another example, in a band of 550 nm to 590 nm or a band within this band, the band is a hemoglobin absorption band peculiar to the real human skin. In still another example, in a band of 960 nm to 980 nm or a band within this band, the band is a moisture absorption band peculiar to the real human skin.

In some implementations, the second feature band $w2$ is selected as a non-absorption peak band of the real human skin, that is, a band with weak absorption (or high reflection) of the real human skin, such as a band of 800 nm to 850 nm or a band within this band.

S330: According to the multispectral image, acquire a first light source spectrum response value $Sw1$ and a second light source spectrum response value $Sw2$ of the first feature band and the second feature band respectively.

The first light source spectrum response value $Sw1$ of the first feature band and the second light source spectrum response value $Sw2$ of the second feature band are acquired according to the multispectral image.

In some implementations of Embodiment 3, existing technologies can be used to acquire the first light source spectrum response value $Sw1$ of the first feature band and the second light source spectrum response value $Sw2$ of the second feature band of the multispectral image.

In some other implementations of Embodiment 3, the light source spectrum response value acquisition methods described in Embodiment 1 and Embodiment 2 can be used to acquire the first light source spectrum response value $Sw1$ of the first feature band and the second light source spectrum response value $Sw2$ of the second feature band. For details not described herein, refer to the related description of Embodiment 1 and Embodiment 2.

First, the RGB image corresponding to the multispectral image is acquired, and the RGB image can be reconstructed according to the multispectral image (referring to Embodiment 1), or the RGB image can be taken for the same scenario when the multispectral image is taken (referring to Embodiment 2). Then the RGB image is converted into a grayscale image. A target region in which the grayscale value is less than a threshold in the grayscale image is determined. Finally, an average value of multispectral response values of the channel of the first feature band in the multiple channels of the target region, that is, the first light source spectrum response value $Sw1$ is calculated; and an average value of multispectral response values of the channel of the second feature band in the multiple channels of the target region, that is, the second light source spectrum response value $Sw2$, is calculated.

It should be noted that, on one hand, since the light source spectrum predicted in the methods of Embodiment 1 and Embodiment 2 is more accurate, the first light source spectrum response value $Sw1$ and the second light source spectrum response value $Sw2$ acquired based on the related description of Embodiment 1 and Embodiment 2 are more accurate, which can improve the precision of the subsequent live detection result. On the other hand, since the light source spectrum prediction method in Embodiment 1 and Embodiment 2 can be applied to application scenarios with different light sources, the live detection solution can be more robust when applied under different light sources.

S340: Calculate the product of $Dw1/Dw2$ and $Sw2/Sw1$, and compare the product with a threshold k, and if the product is less than the threshold k, determine the human body to be a live body.

The multispectral response value of at least one pixel in the first feature band $w1$ is $Dw1$, and the predicted response value of the first feature band $w1$ of the light source spectrum is the first light source spectrum response value $Sw1$. The multispectral response value of at least one pixel in the second feature band $w2$ is $Dw2$, and the predicted response value of the second feature band $w2$ of the light source spectrum is the second light source spectrum response value $Sw2$.

$(Dw1/Dw2)*(Sw2/Sw1)$ is calculated to acquire the product $Rw$, and the product $Rw$ is compared with the threshold k. According to the comparison result, a live detection result is acquired.

As an implementation, first, a ratio of $Dw1$ to $Sw1$ is calculated, that is, a reflectance value of at least one pixel in the first feature band is calculated, which may be recorded as $Rw1$, where $Rw1=Dw1/Sw1$; and a ratio of $Dw2$ to $Sw2$ is calculated, that is, a reflectance value of at least one pixel in the second feature band is calculated, which may be recorded as $Rw2$, where $Rw2=Dw2/Sw2$. Then, a ratio of $Rw1$ to $Rw2$ is calculated, which may be recorded as $Rw$, where $Rw=Rw1/Rw2$, $(Dw1/Dw2)*(Sw2/Sw1)$. Therefore, this implementation may be referred to as a live detection method of a band ratio.

In some embodiments, if the product $Rw$ is less than the threshold k, the human body is determined to be a live body; and if the product $Rw$ is equal to or greater than the threshold k, the human body is determined as a prosthesis. In some other embodiments, the comparison condition is adjusted according to an actual precision requirement of the live detection. For example, when the product $Rw$ is equal to the threshold k, the corresponding live detection result can be set as: the human body is determined to be a live body. This is not limited in this application.

On the basis of the embodiment shown in FIG. 4, in other embodiments, the step of determining the threshold k is also included before step S340.

As an implementation, the process of determining the threshold k includes: First sample reflectance R1 and second sample reflectance R2 of a plurality of real skin samples in the first feature band and the second feature band are acquired, first sample reflectance ratios R1/R2 of the plurality of real skin samples are calculated, and a maximum value a of the first sample reflectance ratios of the plurality of real skin samples is determined. In addition, third sample reflectance R3 and fourth sample reflectance R4 of different types of prosthesis samples in the first feature band and the second feature band are acquired, second sample reflectance ratios R3/R4 of a plurality of prosthesis samples are calculated, and a minimum value b of the second sample reflectance ratios of the plurality of prosthesis samples is determined. Finally, the threshold k is determined according to the maximum value a and the minimum value b.

As a nonrestrictive example, first sample reflectance R1 of M different real skin samples (M is an integer greater than 1) in the first feature band and second sample reflectance R2 of the M different real skin samples in the second feature band are acquired through a spectrometer, and the first sample reflectance ratio R1/R2 of each real skin sample in the M real skin samples is calculated to find a maximum value a of the first sample reflectance ratios of the M real skin samples. In addition, the same processing method as the real skin samples is used, the third sample reflectance R3 in the first feature band and the fourth sample reflectance R4 in the second feature band of N different types of prosthesis samples (N is an integer greater than 1) are collected through a spectrometer, and the second sample reflectance ratio of each prosthesis sample in N prosthesis samples, that is, R3/R4, is calculated to find the minimum value b of the second sample reflectance ratios of N real skin samples. Then a value range of the threshold k is determined according to a and b. For example, the value range of the threshold k is: $(a+b)/2 >= k >= \min(a,b)$, where min represents a minimum value function. That is, the threshold k is greater than or equal to the smaller value of a and b, and the threshold k is less than or equal to the average value of a and b. The specific value of the threshold k can be determined according to the needs of practical applications. In this embodiment, a large number of live bodies and prostheses can be distinguished through a simple threshold k design.

Embodiment 4

FIG. 5 is a flowchart of a live detection method, according to another embodiment of this application. The live detection method in this embodiment may be performed by an electronic device. As shown in FIG. 5, the live detection method may include step S410 to step S440. It should be understood that, for the similarities between Embodiment 4 and Embodiment 3, refer to the description of the above Embodiment 3, which is not repeated herein again.

S410: Acquire a multispectral image including human skin, where the multispectral image includes at least one pixel.

S420: Determine a first multispectral response value Dw1 and a second multispectral response value Dw2 of the at least one pixel in a first feature band and a second feature band respectively.

S430: According to the multispectral image, acquire a first light source spectrum response value Sw1 and a second light source spectrum response value Sw2 of the first feature band and the second feature band respectively.

S440: Calculate a first ratio of Dw1 to Sw1, a second ratio of Dw2 to Sw2, and a third ratio of the first ratio to the second ratio.

The first ratio of Dw1 to Sw1 is calculated, that is, a reflectance value of at least one pixel in the first feature band is calculated, and the first ratio may be recorded as Rw1, where Rw1=Dw1/Sw1. The second ratio of Dw2 to Sw2 is calculated, that is, a reflectance value of at least one pixel in the second feature band is calculated, and the second ratio may be recorded as Rw2, where Rw2=Dw2/Sw2. Then, the third ratio of Rw1 to Rw2 is calculated, and the third ratio may be recorded as Rw, where Rw=Rw1/Rw2, (Dw1/Dw2)*(Sw2/Sw1).

S450: Input the first ratio, the second ratio, and the third ratio into a live detection model to acquire a live detection result.

The live detection model is a trained detection model used to determine whether the human body to be tested is a live body. The first ratio Rw1, the second ratio Rw2, and the third ratio Rw are input into the live detection model, and the model can output a classification result that the human body to be tested is a live body or a prosthesis.

In this embodiment, the live detection model may include a machine learning or deep learning model, for example, a support vector machine model, a neural network model, a Bayesian classifier, or a random forest model. The live detection model is not limited in this application.

In some implementations, the live detection model may include a binary model, and binary results of the binary model include the human body to be tested being a live body and the human body to be tested being a prosthesis. For example, [Rw1, Rw2, Rw1/Rw2] is input into the live detection model, and the output of the model is 1, indicating that the human body to be tested is a live body; and the output is 0, indicating that the human body to be tested is a prosthesis.

In some other implementations, the live detection model may include a multi-classification live detection model. In these implementations, the live detection model may classify the live body and/or prosthesis in more detail. For example, the prosthesis is further classified to distinguish different types or categories of prostheses (if different types or categories of prostheses correspond to different materials of prostheses). A classification quantity of the live detection model is not limited in this application.

It should be noted that, before the live detection model is used, the trained live detection model needs to be acquired. As a nonrestrictive example, the process of acquiring the trained live detection model includes: First sample vectors and corresponding labels of a plurality of real skin samples are acquired, and the first sample vectors include three features: first sample reflectance values of the real skin samples in the first feature band, second sample reflectance values of the real skin samples in the second feature band, and ratios of the first sample reflectance values to the second sample reflectance values. Second sample vectors and corresponding labels of different types of prosthesis samples are acquired, and the second sample vectors include three features: third sample reflectance values of the prosthesis samples in the first feature band, fourth sample reflectance values of the prosthesis samples in the second feature band, and ratios of the third sample reflectance values to the fourth sample reflectance values. The first sample vectors and the corresponding labels, and the second sample vectors and the corresponding labels are used as training samples to train the live detection model, to acquire the trained live detection model. In this way, the trained live detection model can realize the classification of live bodies and prostheses, that is, the trained live detection model can be used to identify whether the human body to be tested is a live body. It should be understood that, as a nonrestrictive example, for the process of acquiring the first sample reflectance values, the second sample reflectance values, the ratios of the first sample reflectance values to the second sample reflectance values, the third sample reflectance values, the fourth sample reflectance values, and the ratios of the third sample reflectance values to the fourth sample reflectance values, reference may be made to the related description of determining the threshold k.

In this embodiment, the band ratio Rw1/Rw2 is added to the reflectance features of two feature bands to form a three-dimensional feature combination vector, that is, [Rw1, Rw2, Rw1/Rw2], which increases the dimension of the feature. The feature combination vector is input into the live detection model to output a live detection result. The live detection result is determined by the three features in [Rw1, Rw2, Rw1/Rw2], so that a more accurate result can be acquired.

It is to be understood that the order of the sequence numbers of the steps in the foregoing embodiments does not mean the order of execution, and the execution order of each process is determined by its function and inherent logic, and does not constitute any limitation on the implementation process of the embodiments of this application.

An embodiment of this application further provides a light source spectrum acquisition apparatus. For details not described in the light source spectrum acquisition apparatus, refer to the description of the method in the above embodiment.

Figure 6:
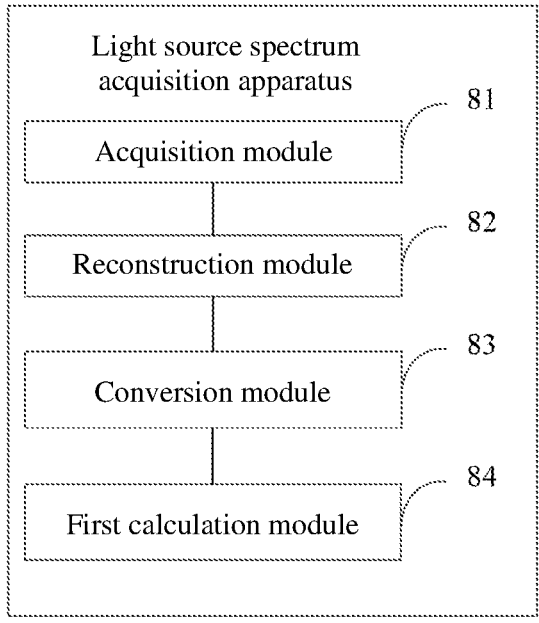
FIG. 6 is a schematic diagram of a light source spectrum acquisition apparatus, according to an embodiment of this application.

FIG. 6 is a schematic block diagram of a light source spectrum acquisition apparatus, according to an embodiment of this application. The light source spectrum acquisition apparatus includes: an acquisition module 81, a reconstruction module 82, a conversion module 83, and a first calculation module 84.

The acquisition module 81 is configured to acquire a multispectral image, and determine a multispectral response value of each pixel in the multispectral image.

The reconstruction module 82 is configured to reconstruct an RGB image according to the multispectral image.

The conversion module 83 is configured to convert the RGB image into a grayscale image.

The first calculation module 84 is configured to determine a target region in the grayscale image, wherein in the target region a grayscale value is less than or equal to a threshold, and calculate a light source spectrum response value according to multispectral response values of pixels of the multispectral image corresponding to the target region.

In some embodiments, as an implementation, a grayscale value corresponding to each pixel in the grayscale image is calculated according to three-channel values of the pixel in the RGB image.

As a nonrestrictive example of this implementation, the grayscale value corresponding to the each pixel is calculated according to the formula deta=abs(1−G/B)+abs(1−R/B), where R, G, and B represent the three-channel values of the each pixel in the RGB image, that is, value R, value G, and value B, and abs represents an absolute value function.

Figure 7:
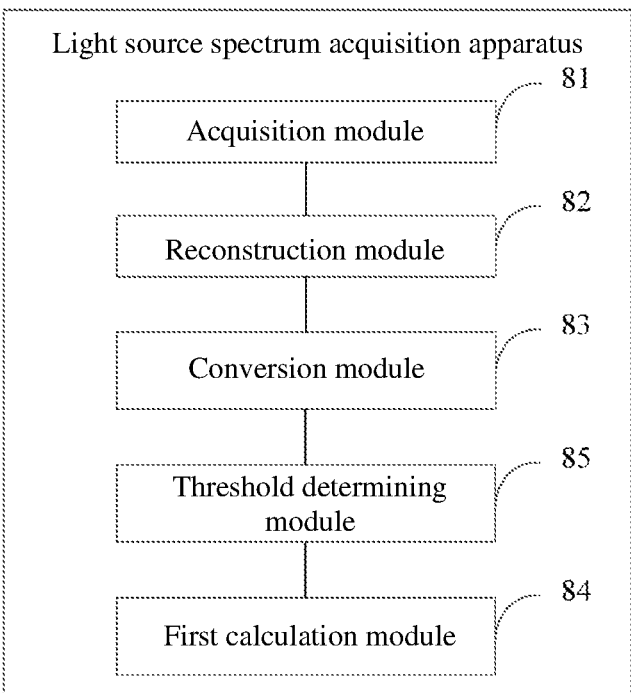
FIG. 7 is a schematic diagram of another light source spectrum acquisition apparatus, according to an embodiment of this application.

In some embodiments, as an implementation, as shown in FIG. 7, the light source spectrum acquisition apparatus further includes: a threshold determining module 85.

The threshold determining module 85 is configured to perform histogram statistics on the grayscale image to obtain a histogram statistical result, and determine the threshold according to interval parameters of a minimum value interval in the histogram statistical result.

As a nonrestrictive example of this implementation, the threshold determining module 85 is configured to determine the threshold according to an interval boundary value and a pixel proportion of the minimum value interval in the histogram statistical result.

In some embodiments, as an implementation, the first calculation module 84 is configured to calculate an average value of the multispectral response values of the pixels corresponding to the target region in the multispectral image to acquire the light source spectrum response value.

An embodiment of this application further provides a multispectral reflectance image acquisition apparatus. For details not described in the multispectral reflectance image acquisition apparatus, refer to the description of the method in Embodiment 1.

Figure 8:
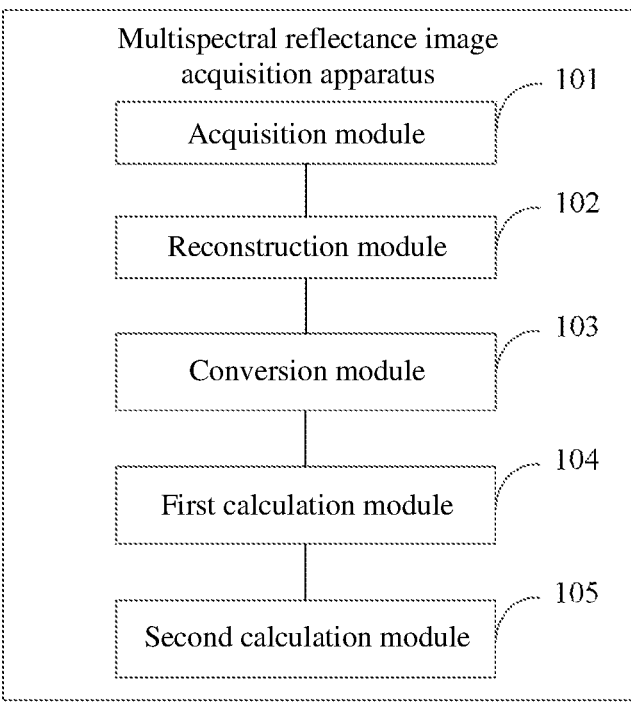
FIG. 8 is a schematic diagram of a multispectral reflectance image acquisition apparatus, according to an embodiment of this application.

FIG. 8 is a schematic block diagram of a multispectral reflectance image acquisition apparatus, according to an embodiment of this application. The multispectral reflectance image acquisition apparatus includes: an acquisition module 101, a reconstruction module 102, a conversion module 103, a first calculation module 104, and a second calculation module 105.

The acquisition module 101 is configured to acquire a multispectral image, and determine a multispectral response value of each pixel in the multispectral image. The reconstruction module 102 is configured to reconstruct an RGB image according to the multispectral image. The conversion module 103 is configured to convert the RGB image into a grayscale image. The first calculation module 104 is configured to determine a target region in the grayscale image, wherein in the target region a grayscale value is less than or equal to a threshold, and calculate a light source spectrum response value according to multispectral response values of pixels of the multispectral image corresponding to the target region. The second calculation module 105 is configured to acquire a multispectral reflectance image according to the multispectral response value of each pixel in the multispectral image and the light source spectrum response value.

In some embodiments, as an implementation, a grayscale value corresponding to each pixel in the grayscale image is calculated according to three-channel values of the pixel in the RGB image.

As a nonrestrictive example of this implementation, a grayscale value corresponding to each pixel is calculated according to the formula deta=abs(1−G/B)+abs(1−R/B), where R, G, and B represent three-channel values of each pixel in the RGB image, that is, value R, value G, and value B.

Figure 9:
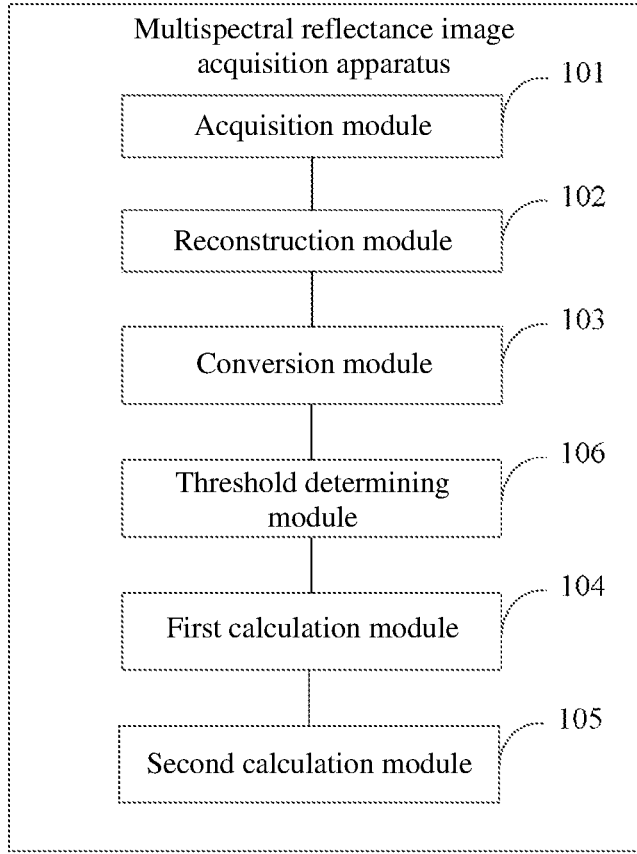
FIG. 9 is a schematic diagram of another multispectral reflectance image acquisition apparatus, according to an embodiment of this application.

In some embodiments, as an implementation, as shown in FIG. 9, the multispectral reflectance image acquisition apparatus further includes: a threshold determining module 106.

The threshold determining module 106 is configured to perform histogram statistics on the grayscale image to obtain a histogram statistical result, and determine the threshold according to interval parameters of a minimum value interval in the histogram statistical result.

As a nonrestrictive example of this implementation, the threshold determining module 106 is configured to: determine the threshold according to an interval boundary value and a pixel proportion of the minimum value interval in the histogram statistical result.

In some embodiments, as an implementation, the first calculation module 104 is configured to calculate an average value of the multispectral response values of the pixels corresponding to the target region in the multispectral image to acquire the light source spectrum response value.

In some embodiments, as an implementation, the second calculation module 105 is configured to acquire the multispectral reflectance image through dividing the multispectral response value of each pixel in the multispectral image by the light source spectrum response value.

Figure 10:
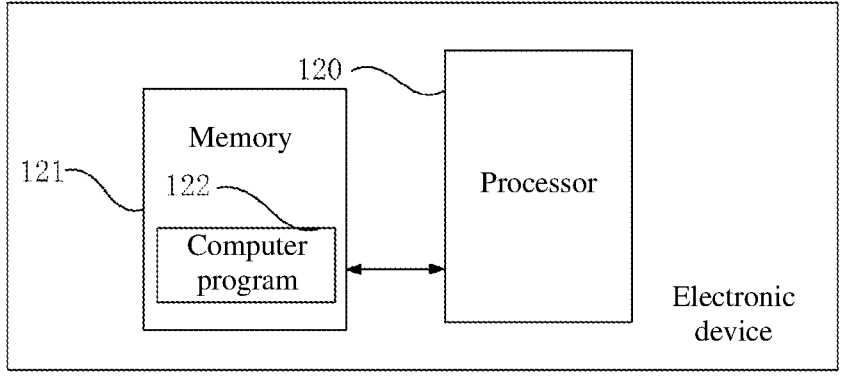
FIG. 10 is a schematic diagram of an electronic device, according to an embodiment of this application.

An embodiment of this application further provides an electronic device. As shown in FIG. 10, the electronic device may include one or more processors 120 (only one is shown in FIG. 10), a memory 121, and a computer program 122 stored in the memory 121 and executable on the one or more processors 120, such as a program for acquiring a light source spectrum and/or a multispectral reflectance image. The one or more processors 120, when executing the computer program 122, can perform steps in the light source spectrum acquisition method embodiment and/or the multispectral reflectance image acquisition method embodiment. Alternatively, the one or more processors 120, when executing the computer program 122, can perform functions of the module/units in the light source spectrum acquisition apparatus embodiment and/or the multispectral reflectance image acquisition apparatus embodiment, which is not limited herein.

A person skilled in the art may understand that FIG. 10 is merely an example of the electronic device, and does not constitute a limitation to the electronic device. The electronic device may include more or fewer components than those shown in the figure, or some components may be combined, or different components may be included. For example, the electronic device may further include an input/output device, a network access device, a bus, and the like.

In an embodiment, the processor 120 may be a central processing unit (CPU), or may be another general-purpose processor, a digital signal processor (DSP), an application specific integrated circuit (ASIC), a field-programmable gate array (FPGA), or another programmable logic device, a discrete gate or a transistor logic device, a discrete hardware component, or the like. The general-purpose processor may be a microprocessor, or the processor may be any conventional processor or the like.

In an embodiment, the memory 121 may be an internal storage unit of the electronic device, such as a hard disk or a memory of the electronic device. The memory 121 may be alternatively an external storage device of the electronic device, such as a plug-in hard disk, a smart media card (SMC), a secure digital (SD) card, or a flash card that is equipped on the electronic device. Further, the memory 121 may further include an internal storage unit of the electronic device and an external storage device. The memory 121 is configured to store a computer program and other programs and data required by the electronic device. The memory 121 may be further configured to temporarily store data that is outputted or to be outputted.

A person skilled in the art may clearly understand that, for the purpose of convenient and brief description, only division of the foregoing function units is used as an example for description. In the practical application, the functions may be allocated to and completed by different functional modules according to requirements. That is, an internal structure of the device is divided into different functional units or modules, to complete all or some of the functions described above. Functional units and modules in the embodiments may be integrated into one processing unit, or each of the units may exist alone physically, or two or more units are integrated into one unit. The integrated unit may be implemented in the form of hardware, or may be implemented in the form of a software function unit. In addition, the specific names of each functional unit and module are only for the purpose of distinguishing each other, and are not used to limit the protection scope of this application. For specific work processes of the units and modules in the system, reference may be made to corresponding processes in the foregoing method embodiments, and details are not described herein again.

An embodiment of this application further provides a computer-readable storage medium, storing a computer program, where the computer program, when executed by a processor, implements the steps of the light source spectrum acquisition method embodiment and/or the multispectral reflectance image acquisition method embodiment.

An embodiment of this application provides a computer program product. When run on an electronic device, the computer program product causes the electronic device to implement the steps of the light source spectrum acquisition method embodiment and/or the multispectral reflectance image acquisition method embodiment.

In the embodiments, descriptions of the embodiments have different emphases. As for parts that are not described in detail in one embodiment, reference can be made to the relevant descriptions of the other embodiments.

A person of ordinary skill in the art may notice that the exemplary units and algorithm steps described with reference to the embodiments disclosed in this specification can be implemented in electronic hardware, or a combination of computer software and electronic hardware. Whether the functions are executed in a mode of hardware or software depends on particular applications and design constraint conditions of the technical solutions. A person skilled in the art may use different methods to implement the described functions for each particular application, but it is not to be considered that the implementation goes beyond the scope of this application.

In the embodiments provided in this application, it is to be understood that the disclosed apparatus/electronic device and method may be implemented in other manners. For example, the described apparatus/electronic device embodiment is merely exemplary. For example, the division of modules or units is merely a logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separated, and the components displayed as units may or may not be physical units, and may be located in one place or may be distributed over a plurality of network units. Some or all of the units may be selected according to actual requirements to achieve the objectives of the solutions of the embodiments.

In addition, functional units in the embodiments of this application may be integrated into one processing unit, or each of the units may be physically separated, or two or more units may be integrated into one unit. The integrated unit may be implemented in the form of hardware, or may be implemented in a form of a software functional unit.

When the integrated module/unit is implemented in the form of a software functional unit and sold or used as an independent product, the integrated unit may be stored in a computer-readable storage medium. Based on such under-standing, in this application, all or some of the processes of the methods in the embodiments may be implemented by a computer program instructing relevant hardware. The computer program may be stored in a computer-readable storage medium. During execution of the computer program by the processor, steps of the foregoing method embodiments may be implemented. The computer program includes computer program code. The computer program code may be in source code form, object code form, executable file or some inter-mediate forms, or the like. The computer-readable medium may include: any entity or apparatus that is capable of carrying the computer program code, a recording medium, a USB flash drive, a removable hard disk, a magnetic disk, an optical disc, a read-only memory (ROM), a random access memory (RAM), an electric carrier signal, a telecommuni-cation signal and a software distribution medium, or the like. It should be noted that, the content contained in the com-puter-readable medium may be appropriately increased or decreased according to the requirements of legislation and patent practice in jurisdictions. For example, in some juris-dictions, according to legislation and patent practice, the computer-readable medium does not include an electric carrier signal and a telecommunication signal.

The foregoing embodiments are merely used for describ-ing the technical solutions of this application, but are not intended to limit this application. Although this application is described in detail with reference to the foregoing embodiments, it should be appreciated by a person skilled in the art that, modifications can be made to the technical solutions described in the foregoing embodiments, or equivalent replacements can be made to some technical features in the technical solutions, as long as such modifi-cations or replacements do not cause the essence of corre-sponding technical solutions to depart from the spirit and scope of the technical solutions of the embodiments of this application, which shall fall within the protection scope of this application.

What is claimed is:

1. A light source spectrum acquisition method, compris-ing:
    acquiring a multispectral image, and determining a mul-tispectral response value of each pixel in the multispec-tral image;
    reconstructing an RGB image according to the multispec-tral image;
    converting the RGB image into a grayscale image; and
    determining a target region in the grayscale image, wherein in the target region a grayscale value is less than or equal to a threshold, and calculating a light source spectrum response value according to multi-spectral response values of pixels of the multispectral image corresponding to the target region.

2. The method according to claim 1, wherein a grayscale value corresponding to a pixel in the grayscale image is calculated according to three-channel values of a pixel in the RGB image.

3. The method according to claim 1, wherein after the converting the RGB image into the grayscale image, the method further comprises:
    performing histogram statistics on the grayscale image to obtain a histogram statistical result, and determining the threshold according to interval parameters of a minimum value interval in the histogram statistical result.

4. The method according to claim 3, wherein the deter-mining the threshold according to interval parameters of the minimum value interval in the histogram statistical result comprises:
    determining the threshold according to an interval bound-ary value and a pixel proportion of the minimum value interval in the histogram statistical result.

5. The method according to claim 1, wherein the calcu-lating the light source spectrum response value according to the multispectral response values of pixels of the multispec-tral image corresponding to the target region comprises:
    calculating an average value of the multispectral response values of the pixels of the multispectral image corre-sponding to the target region to acquire the light source spectrum response value.

6. A non-transitory computer-readable storage medium storing a computer program, where the computer program, when executed by a processor, causes the processor to perform the method of claim 1.

7. The non-transitory computer-readable storage medium according to claim 6, wherein the method further comprises acquiring a multispectral reflectance image according to the multispectral response value of each pixel in the multispec-tral image and the light source spectrum response value.

8. A multispectral reflectance image acquisition method, comprising:
    acquiring a multispectral image, and determining a mul-tispectral response value of each pixel in the multispec-tral image;
    reconstructing an RGB image according to the multispec-tral image;
    converting the RGB image into a grayscale image; and
    determining a target region in the grayscale image, wherein in the target region a grayscale value is less than or equal to a threshold, and calculating a light source spectrum response value according to multi-spectral response values of pixels of the multispectral image corresponding to the target region; and
    acquiring a multispectral reflectance image according to the multispectral response value of each pixel in the multispectral image and the light source spectrum response value.

9. The method according to claim 8, wherein a grayscale value corresponding to a pixel in the grayscale image is calculated according to three-channel values of a pixel in the RGB image.

10. The method according to claim 8, wherein after the converting the RGB image into the grayscale image, the method further comprises:
    performing histogram statistics on the grayscale image to obtain a histogram statistical result, and determining the threshold according to interval parameters of a minimum value interval in the histogram statistical result.

11. The method according to claim 10, wherein the determining the threshold according to interval parameters of the minimum value interval in the histogram statistical result comprises:
    determining the threshold according to an interval bound-ary value and a pixel proportion of the minimum value interval in the histogram statistical result.

12. The method according to claim 8, wherein the calcu-lating the light source spectrum response value according to the multispectral response values of pixels of the multispec-tral image corresponding to the target region comprises:

calculating an average value of the multispectral response values of the pixels of the multispectral image corresponding to the target region to acquire the light source spectrum response value.

13. An electronic device, comprising a memory, a processor, and a computer program stored in the memory and executable on the processor, wherein the processor, when executing the computer program, is configured to perform operations comprising:

acquiring a multispectral image, and determining a multispectral response value of each pixel in the multispectral image;

reconstructing an RGB image according to the multispectral image;

converting the RGB image into a grayscale image; and determining a target region in the grayscale image, wherein in the target region a grayscale value is less than or equal to a threshold, and calculating a light source spectrum response value according to multispectral response values of pixels of the multispectral image corresponding to the target region.

14. The electronic device according to claim 13, wherein a grayscale value corresponding to a pixel in the grayscale image is calculated according to three-channel values of a pixel in the RGB image.

15. The electronic device according to claim 13, wherein after the converting the RGB image into the grayscale image, the operations further comprise:

performing histogram statistics on the grayscale image to obtain a histogram statistical result, and determining the threshold according to interval parameters of a minimum value interval in the histogram statistical result.

16. The electronic device according to claim 15, wherein the determining the threshold according to interval parameters of the minimum value interval in the histogram statistical result comprises:

determining the threshold according to an interval boundary value and a pixel proportion of the minimum value interval in the histogram statistical result.

17. The electronic device according to claim 13, wherein the calculating the light source spectrum response value according to the multispectral response values of pixels of the multispectral image corresponding to the target region comprises:

calculating an average value of the multispectral response values of the pixels of the multispectral image corresponding to the target region to acquire the light source spectrum response value.

18. The electronic device according to claim 13, wherein the operations further comprise acquiring a multispectral reflectance image according to the multispectral response value of each pixel in the multispectral image and the light source spectrum response value.

* * * * *